June 3, 1924. 1,496,671
H. GERNSBACK
DETECTOR
Filed Feb. 24, 1923
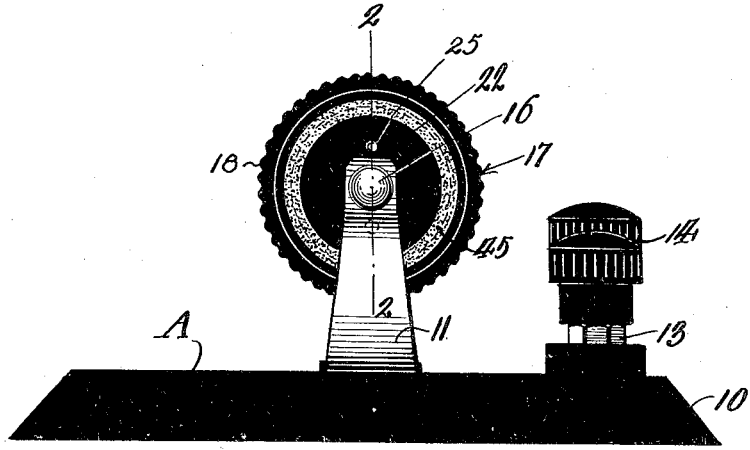
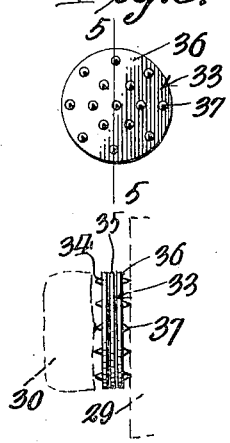
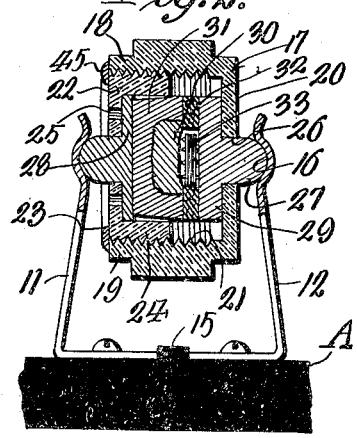
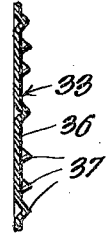
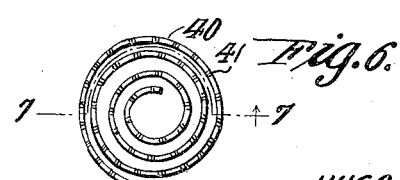
Inventor
HUGO GERNSBACK Patented June 3, 1924.

1,496,671

UNITED STATES PATENT OFFICE.

HUGO GERNSBACK, OF NEW YORK, N. Y.

DETECTOR.

Application filed February 24, 1923. Serial No. 621,049.

*To all whom it may concern:*

Be it known that I, HUGO GERNSBACK, a citizen of the United States, residing at New York, in the county of New York and State of New York, have invented certain new and useful Improvements in a Detector, of which the following is a specification.

This invention relates to radio apparatus and more particularly to detectors of the crystal type and the primary object of the invention is to provide an improved detector, which will operate efficiently under all conditions and in which a good contact between the "feeler" and the crystal is established at all times.

In crystal detectors of the ordinary type, a feeler wire or a "cat-whisker," as the same is commonly called, is utilized for finding and establishing contact with a sensitive point on the crystal. The single feeler wire or "cat-whisker" is usually knocked out of contact by the impact or vibration and it then becomes necessary to hunt all over the surface of the crystal again to find a new sensitive point.

It is therefore another prime object of the invention, to provide a detector in which the above mentioned difficulty is eliminated and in which the single feeling wire or "cat-whisker" is disposed with and a feeler member substituted therefor having a plurality of feeling or contact points for engaging a plurality of different places on the crystal, so that if one point is displaced from out of engagement with a sensitive spot on the crystal, other feeler points will automatically engage other sensitive spots on the crystal, whereby a crystal detector is provided which works permanently, as has been actually found to be the case in practice.

A further object of the invention is to provide an improved crystal detector embodying the usual crystal, an annular compression gasket, feeler plates disposed in the compression gasket for engaging the crystal and means for adjusting the plates in relation to the crystal, until the proper pressure between the plates and crystal is established.

With these and other objects in view the invention consists in the novel construction, arrangement and formation of parts, as will be hereinafter more specifically described, claimed and illustrated in the accompanying drawings, in which drawings:

Figure 1 is a side elevation of the improved crystal detector.

Figure 2 is a transverse vertical section through the same taken on the line 2—2 of Figure 1.

Figure 3 is a detail elevation of one of the feeler plates utilized in the improved detector.

Figure 4 is an edge elevation of a plurality of feeler plates used in conjunction with one another.

Figure 5 is a diametric section through one of the feeler plates taken on the line 5—5 of Figure 3.

Figure 6 is an elevation of a modified form of feeler, which can be used with the improved detector.

Figure 7 is a section through the same taken on the line 7—7 of Figure 6.

Referring to the drawings in detail, wherein similar reference characters designate corresponding parts throughout the several views the letter A generally indicates a crystal detector constructed in accordance with my invention which includes a base plate 10 formed of insulating material. A pair of resilient electric conducting supporting arms 11 and 12 are secured in any preferred way to the base plate 10 and these arms are electrically connected in any manner, as is well known in the art, with binding posts 13 and 14. These resilient electric constructing supporting arms 11 and 12 are held in spaced insulated relation, by means of a projection 15 disposed between said arms, which is formed on the upper surface of the base plate 10. The upper terminals of the arms 11 and 12 are provided with struck-in sockets 16, for a purpose, which will be hereinafter more fully described.

Detachably supported by the arms 11 and 12 is the detecting portion 17 of the apparatus which consists of a housing 18 formed of electric insulating material. This housing 18 embodies an annular side wall 19 and a disk-shaped end wall 20. The inner surface of the annular side wall 19 can be provided with screw-threads 21 for the reception of the adjusting plug 22, which is also formed of electric insulating material. This adjusting plug 22 includes a flat disk-shaped wall 23 and an annular flange 24 having screw threads on its outer surface for engaging the threads 21 formed on the wall 19 of the housing 17. In order to permit the ready adjustment of the plug 22 its wall 23 can be provided with openings 25 for the reception of a spanner wrench or the like.

The walls 20 and 23 are provided with axially aligned openings 26 for the reception of the outwardly extending axially disposed lugs 27 formed on the contact plates 28 and 29. The contact plate 29 is preferably formed relatively thicker than the contact plate 28, so that the plate will have sufficient weight and thickness for the purpose intended. The lugs 27 are adapted to extend outwardly of the walls 20 and 23 and engage in the sockets 16 formed in the resilient supporting arms 11 and 12.

Arranged within the housing 17 is the crystal proper 30 which can be fitted in a block of wood metal 31. This block 31 engages the plate 28.

An annular compression washer 32 formed of cork, rubber, felt, or the like is placed in engagement with the inner face of the block 31 and engages the inner face of the plate 22.

Disposed within the annular compression gasket 32 is the feeler portion 33 of the apparatus which forms the most vital part of my invention.

This feeler portion 33 can be formed in different ways providing a plurality of spaced contact points is formed for engaging the crystal 30 and the contact plate 29.

In Figure 4 I have disclosed a plurality of feeler plates 34, 35 and 36, and in actual practice I have found that three feeler plates can be used to the best of advantage, but it is to be understood that only one plate can be used if so desired. The plate 35 is disposed between the plates 34 and 36 and is provided with opposite plane faces. The plates 34 and 36 have struckout from the body thereof outwardly extending contact points 37 which are adapted to engage respectively the crystal 30 and the contact plate 29. The plates 34, 35 and 36 are preferably formed from gold, as gold has been found to be the only metal that gives a high sensitivity with crystal galena, iron pyrites or other sensitive crystal. Gold is not oxidizable and does not give rise to surface resistance at the points, which are sharp. While, it is not desired to limit the making of the plates of gold, nevertheless, gold has been found to be the best material. The weight of the metal is also important in the adjustment of the device, which will be hereinafter described.

In Figures 6 and 7 is shown another type of feeler which can be used in lieu of feeler plates, and as shown this feeler comprises a wire 40 spirally wound, which is equipped to provide a plurality of oppositely directed points 41 and 42. It is obvious however, that the feelers can be made in other ways and I do not wish to limit myself to the exact construction of the feeler, as in all probability other types of feelers can be used providing the same are provided with a plurality of contact points.

One of the important features of the invention is the adjustment provided between the contact plates 28 and 29, whereby the correct pressure between the crystal 30 and the plate 29 is obtained. It is absolutely necessary in connection with the detector, that a pressure arrangement be provided.

In obtaining this pressure, the plug 22 is screwed in or out of the housing 17. In actual practice the plug is screwed in up to a certain critical point and once this critical pressure has been found, the detector is sealed as at 45, by shellac, or other means. This gives the detector a permanent setting.

It should be understood, that the plates 34, 35 and 36 are never compressed tightly, but they must always be slightly loose. There results, thereby, a sort of microphonic contact which is very critical. If the pressure is not sufficient, the detector will not work. In other words, if the plate or plates are too loose no results will be obtained. If too much pressure is applied, a permanent solid contact is established between the points and the crystal and the detector will not work. It is this critical pressure that is very important.

It is obvious, that if the detector is jarred or vibrated in any way, and that one contact point which may have been in engagement with a sensitive point of the crystal becomes moved away from the same, that one of the other points will find another sensitive point of the crystal and thus a detector has been provided which in reality works permanently.

Changes in details may be made without departing from the spirit or the scope of this invention.

What I claim as new is:—

1. A detector comprising a pair of contact plates disposed in spaced relation, a crystal, an annular compressible washer surrounding the crystal and engaging one contact plate, a feeler member embodying a plurality of contact points disposed within the compression washer for engaging the crystal and the mentioned contact plate and means for varying the pressure between the two contact plates, as and for the purpose specified.

2. In a detector, a casing of insulation including an annular side wall provided with internal threads and an end wall, a plug inserted into said housing including an outer wall and a threaded flange for engaging the threads of the side wall of the housing, the end wall of the housing and the wall of the plug having aligned axial openings therein, contact plates disposed in the housing having outwardly extending contact lugs disposed in and projecting out of said openings, a crystal, a block for the crystal disposed in the housing engaging one contact plate, an annular compressible washer engaging the block and the other contact plate, a feeler member disposed within the compressible washer between the crystal and the last mentioned contact plate, and a plurality of contact points formed on the feeler member, the threaded plug forming means for adjusting the pressure on the compressible washer, whereby the position of the feeler member can be adjusted.

3. In a detector, a crystal, a block for the crystal, an annular compressible washer engaging the block around the crystal, a pair of contact plates for engaging the block and the compressible washer, and a feeler member disposed within the compressible washer including a plurality of plates, certain of the plates having a plurality of contact points formed thereon.

4. In a detector, a crystal, a block supporting the crystal, an annular compressible washer engaging one end of the block and surrounding the crystal, a contact plate engaging the other end of the block, a second contact plate engaging the compressible washer, a feeler member disposed within the compressible washer between the last mentioned contact plate and the crystal, said feeler member including a central plate having plane faces and side plates having a plurality of contact feeler points formed thereon for engaging the crystal and the second mentioned plate, and means for adjusting the pressure between said contact plates.

5. In a crystal detector, a metal feeler plate having a plurality of spaced feeler points struck-out from one face thereof.

6. In a crystal detector, a feeler member including a central plate having plane opposite faces and side plates having a plurality of struck-out feeler points thereon.

7. In a detector, a block of insulation, a pair of upstanding resilient electric conducting arms secured to the block of insulation having sockets formed therein adjacent to the outer ends thereof, a housing formed of insulating material including an annular side wall, an end wall, a plug of insulating material adjustably carried by the side wall, the plug and end wall having aligned axial openings, a crystal disposed in the housing, a block for receiving the crystal, a compressible washer of annular configuration engaging the inner face of the block and surrounding the crystal, a contact plate engaging the outer face of the block, a second contact plate engaging the outer face of the compressible washer, outwardly extending contact lugs formed on the contact plates extending through said openings and detachably fitted in said sockets, and a feeler member including a plurality of contact points disposed within the compressible washer and engaging the crystal and the second mentioned contact plate.

In testimony whereof I affix my signature in presence of two witnesses.

HUGO GERNSBACK.

Witnesses:
HALSEY M. KENNEDY,
JOS. F. ODENBACH.